(12) United States Patent
Priefert et al.

(10) Patent No.: US 12,017,305 B2
(45) Date of Patent: Jun. 25, 2024

(54) SYSTEM OF ELONGATED TUBES AND A JOINT

(71) Applicant: Priefert Mfg. Co, Inc., Mt Pleasant, TX (US)

(72) Inventors: William D. Priefert, Mt. Pleasant, TX (US); Rocky Christenberry, Mt. Vernon, TX (US); Michael Roberts, Mt. Plesant, TX (US); Haskell Easley, Mt. Pleasant, TX (US)

(73) Assignee: Priefert Mfg. Co., Inc., Mt. Pleasant, TX (US)

( * ) Notice: Subject to any disclaimer, the term of this patent is extended or adjusted under 35 U.S.C. 154(b) by 380 days.

(21) Appl. No.: 17/148,261

(22) Filed: Jan. 13, 2021

(65) Prior Publication Data

US 2021/0187671 A1 Jun. 24, 2021

Related U.S. Application Data

(62) Division of application No. 15/612,929, filed on Jun. 2, 2017, now Pat. No. 10,974,348.

(Continued)

(51) Int. Cl.
*B23K 31/02* (2006.01)
*B23K 1/00* (2006.01)
(Continued)

(52) U.S. Cl.
CPC .......... *B23K 31/027* (2013.01); *B23K 1/0008* (2013.01); *B23K 33/002* (2013.01);
(Continued)

(58) Field of Classification Search
None
See application file for complete search history.

(56) References Cited

U.S. PATENT DOCUMENTS

| 1,823,028 A | 9/1931 | Caldwell |
| 2,192,904 A | 3/1940 | Ferris |

(Continued)

FOREIGN PATENT DOCUMENTS

| CN | 203052060 U | * 7/2013 |
| CN | 103433701 A | * 12/2013 |

(Continued)

OTHER PUBLICATIONS

Machine translation of Korea Patent No. 20060103595-A, Mar. 2023.*

(Continued)

*Primary Examiner* — Geoffrey S Evans
(74) *Attorney, Agent, or Firm* — Dentons Davis Brown; Matthew Warner-Blankenship; Kassandra Ricklefs

(57) ABSTRACT

The disclosed apparatus, systems and methods relate to the design principles for forming a welded joint between two sections of tubing or pipe. The material at the end portion of a first section of tubing to is folded inwardly to create a support surface. This support surface improves the ability to weld light gage material with traditional arc welding and it creates conditions to allow brazing to be as strong as traditional arc welding by using A shaped piece of filler material which is located at the intersection between the support surface of the first section of tubing and a side wall section of the second section of tubing. While holding together the first and second sections of tubing with the filler material, heat is applied at the intersection at a temperature and for a duration sufficient to melt the filler material and form the 3t joint.

13 Claims, 8 Drawing Sheets

Related U.S. Application Data

(60) Provisional application No. 62/344,686, filed on Jun. 2, 2016.

(51) Int. Cl.
 *B23K 33/00* (2006.01)
 *B23K 35/28* (2006.01)
 *B23K 35/30* (2006.01)

(52) U.S. Cl.
 CPC .......... *B23K 33/006* (2013.01); *B23K 35/286* (2013.01); *B23K 35/302* (2013.01)

(56) References Cited

U.S. PATENT DOCUMENTS

| | | | |
|---|---|---|---|
| 3,232,645 A | | 2/1966 | Bucks |
| 3,497,245 A | * | 2/1970 | Metzger ................ F16L 41/021 |
| | | | 285/289.1 |
| 4,253,224 A | | 3/1981 | Hickman et al. |
| 5,839,647 A | * | 11/1998 | Orne .................... B23K 37/053 |
| | | | 269/49 |
| 6,708,730 B2 | * | 3/2004 | Chikuma ............. F16L 37/008 |
| | | | 138/155 |
| 2004/0035504 A1 | | 2/2004 | Ananthanarayanan et al. |
| 2004/0222193 A1 | | 11/2004 | Ananthanarayanan et al. |
| 2006/0231597 A1 | * | 10/2006 | Ananthanarayanan ....................... |
| | | | B23K 11/093 |
| | | | 228/171 |
| 2009/0036820 A1 | * | 2/2009 | Dakin .................... A61B 17/11 |
| | | | 604/9 |
| 2013/0136540 A1 | | 5/2013 | Jones et al. |
| 2015/0110548 A1 | * | 4/2015 | Reid .................... B23K 1/0008 |
| | | | 228/248.1 |

FOREIGN PATENT DOCUMENTS

| | | | | |
|---|---|---|---|---|
| CN | 105234568 A | | 1/2016 | |
| CN | 205041573 U | * | 2/2016 | |
| DE | 8907978 U1 | | 11/1989 | |
| EP | 120132 A2 | | 1/2003 | |
| GB | 1548688 A | | 7/1979 | |
| JP | 5943986 A | | 3/1984 | |
| JP | 02197377 | | 8/1990 | |
| KR | 20060103595 A | * | 10/2006 | |
| WO | WO-2014167041 A1 | * | 10/2014 | ........... B23K 9/0288 |

OTHER PUBLICATIONS

Sperko, Brazing Copper Tubing Better and Faster', Dec. 2003, Brazing Dimpler Corporation, pp. 1-16 (Year: 2003).*
"General Brazing Guidelines", Dec. 2009, National Certified Pipe Welding Bureau (NCPWB), pp. 1-30 (Year: 2009).*
Machine translation of CN-203052060-U, 2023.*
Machine translation of CN-103433701-A, 2023.*
Machine translation of CN-205041573-U, Feb. 2024 (Year: 2024).*

* cited by examiner

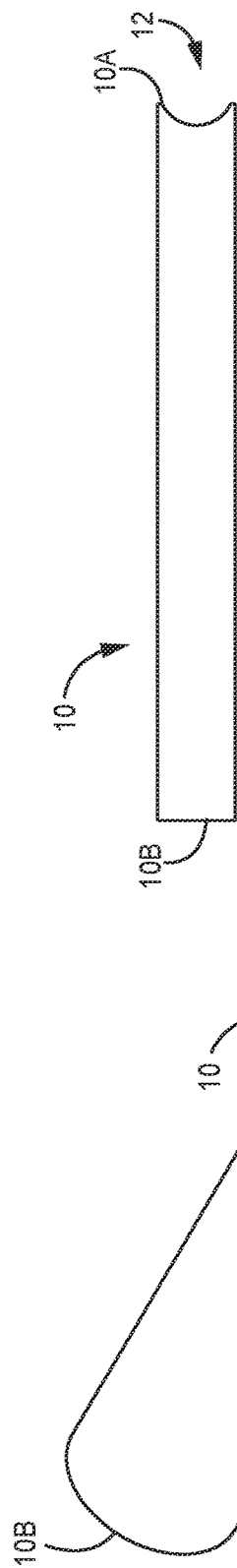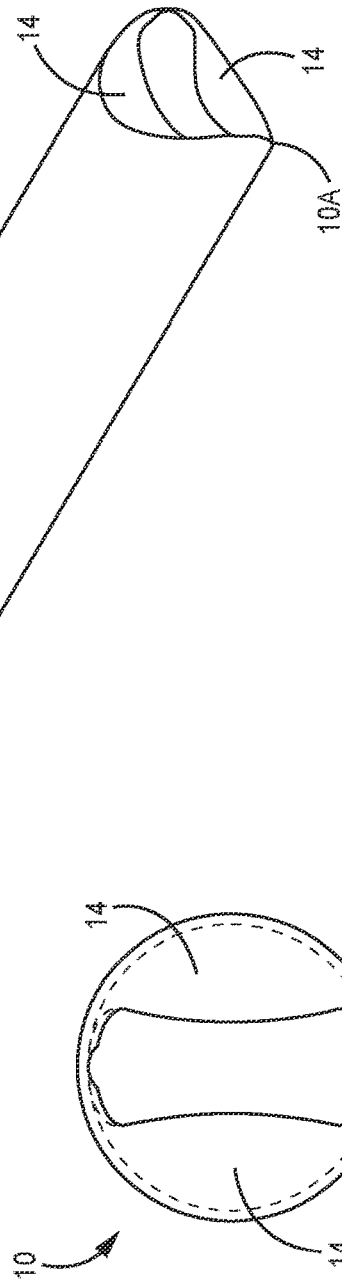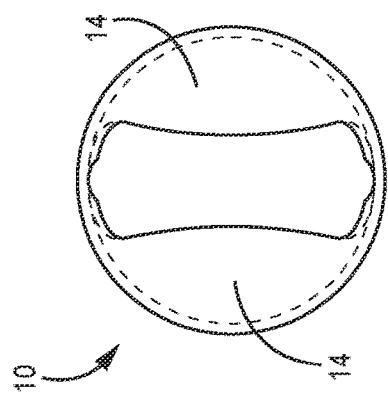

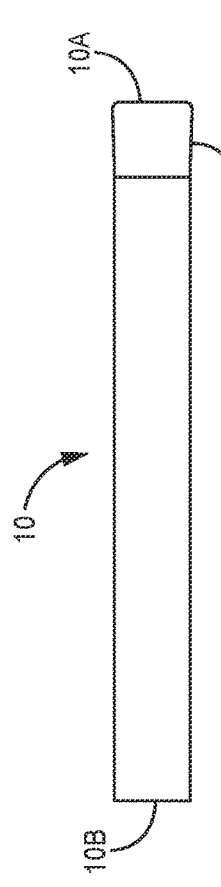
FIG. 7
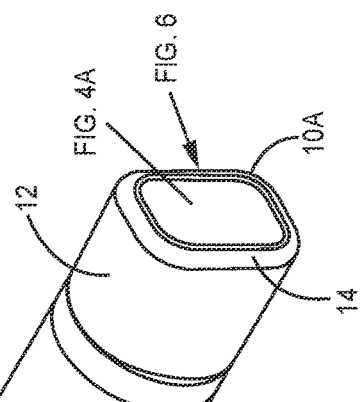
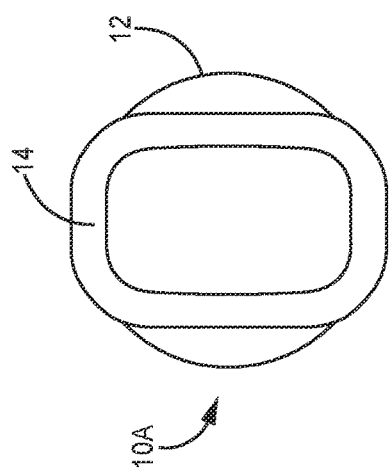
FIG. 8
FIG. 9

SYSTEM OF ELONGATED TUBES AND A JOINT

CROSS-REFERENCE TO RELATED APPLICATION(S)

This application claims priority to U.S. Provisional Application No. 62/344,686 filed Jun. 2, 2016 and entitled "Method of Forming a Joint," which is hereby incorporated by reference in its entirety under 35 U.S.C. § 119(e).

TECHNICAL FIELD

The disclosed technology relates generally to methods of forming a joint and, more specifically, to a novel, non-obvious method of forming a perpendicular joint in light gage tubing or pipe, and in particular, to the devices, methods, and design principles allowing the user to join tubing, pipe or other materials.

BACKGROUND

The disclosure relates to apparatus, systems and methods for joining metal. It is understood that when welding light gage tubing or pipe together in a perpendicular T-joint, fitters typically create a joint known as a "cope" or "saddle." These joints are cut on the end of the tubing or pipe so that the intersecting joint fits the profile of the other piece of tubing or pipe, and make it possible to have a clean, welded joint.

One of the challenges, especially when welding light gage pipe or tubing, however, is the issue of burning through the material, otherwise known as "blowing a hole" due to the nature of the traditional fit. A traditional cope or saddle cut leaves a sharp edge on the end of the tubing where it is joined to the perpendicular piece. As an arc is struck in the welding process, heating is accelerated on the sharp edge of the tubing than at the wall of the perpendicular part. This acceleration can quickly cause the sharp edge to melt away, forming a hole, and requires an exceptionally skilled welder to prevent blowing a hole.

Thus, there is a need in the art for improved welding devices, systems and methods.

BRIEF SUMMARY

Discussed herein are various devices, systems and methods relating to a reduction in the "blowing a hole" failures by forming a saddle or cope in such a way as to reduce the skill level required of the welder by removing the sharp edge where the heating accelerates and further creating a support material for the joining process, as well as creating a formed fit to the adjacent part. In various implementations, various shapes and sizes of tubing or pipe can be used, such as round, square, rectangular, oval, and other shapes well known in the art.

In certain aspects, by forming the end condition, the joint system creates a thicker surface that works as a support for traditional arc welding on lighter gage materials to prevent "blowing a hole"

In certain aspects, by forming the end condition, the joint system and resultant joints are able to meet or exceed the requirements of the 3T rule required for brazing applications when joining light gage material.

One Example includes a joint including: a first tube including an end condition including a support section flange; a substantially planar filler material; and a second elongate tube, where the filler material is disposed between the support section flange and second elongate tube.

This Example may include one or more of the following features. The joint where the joint satisfies the 3T rule. The joint where the end condition is a saddle or coped end condition. The joint where the support section flange is disposed against a flat portion of the second elongate tube. The joint where the support section flange is round. The joint where the support section flange is square. The joint where the substantially planar filler material is selected from the group including of silicon-bronze, aluminum-silicon, copper, brass and bronze. The joint where the substantially planar filler material is a planar sheet. The joint where the substantially planar filler material is substantially disc-shaped. The joining system where the formed joint satisfies the 3T rule. The joining system where the filler material is selected from the group including of silicon-bronze, aluminum-silicon, copper, brass and bronze. The joining system where the filler material is a planar sheet. The joining system where the filler material is substantially disc-shaped. The method where a saddle or coped end condition is formed in the end of the first section of tubing and the second section of tubing had a circular cross section at the intersection. The method where a planar edge flange section end condition is formed in the first section of tubing and the second section of tubing has a wall section at the intersection. The method where the joint is constructed and arranged so as to have at least three times the surface contact as the thinnest portion of the first or second elongate tube. The method where the joint satisfies the 3T rule. The method where the filler material is selected from the group including of silicon-bronze, aluminum-silicon, copper, brass and bronze.

Another Example includes a joining system, including: a first elongate tube including an end condition including a support section; a filler material; and a second elongate tube, where the support section is constructed and arranged to create a joint by being welded to the second elongate tube by disposing the filler material adjacent to the support section and second elongate tube and heating the filler material.

Implementations of this Example may include one or more of the following features. The joining system where the formed joint satisfies the 3T rule. The joining system where the filler material is selected from the group including of silicon-bronze, aluminum-silicon, copper, brass and bronze. The joining system where the filler material is a planar sheet. The joining system where the filler material is substantially disc-shaped. The method where a saddle or coped end condition is formed in the end of the first section of tubing and the second section of tubing had a circular cross section at the intersection. The method where a planar edge flange section end condition is formed in the first section of tubing and the second section of tubing has a wall section at the intersection. The method where the joint is constructed and arranged so as to have at least three times the surface contact as the thinnest portion of the first or second elongate tube. The method where the joint satisfies the 3T rule. The method where the filler material is selected from the group including of silicon-bronze, aluminum-silicon, copper, brass and bronze.

Another Example includes a method for forming a welded joint, including the steps of: folding inwardly material at the end portion of a first tube to create a support section; locating a filler material at the intersection between the support surface of the first tube and a side wall section of a second tube; and holding the first and second sections of tubing together with the filler material while heat is applied at the intersection at a temperature and for a duration sufficient to melt the filler material and form the joint.

Implementations of this Example may include one or more of the following features. The method where a saddle or coped end condition is formed in the end of the first section of tubing and the second section of tubing had a circular cross section at the intersection. The method where a planar edge flange section end condition is formed in the first section of tubing and the second section of tubing has a wall section at the intersection. The method where the joint is constructed and arranged so as to have at least three times the surface contact as the thinnest portion of the first or second elongate tube. The method where the joint satisfies the 3T rule. The method where the filler material is selected from the group including of silicon-bronze, aluminum-silicon, copper, brass and bronze.

While multiple embodiments are disclosed, still other embodiments of the disclosure will become apparent to those skilled in the art from the following detailed description, which shows and describes illustrative embodiments of the disclosed apparatus, systems and methods. As will be realized, the disclosed apparatus, systems and methods are capable of modifications in various obvious aspects, all without departing from the spirit and scope of the disclosure. Accordingly, the drawings and detailed description are to be regarded as illustrative in nature and not restrictive.

BRIEF DESCRIPTION OF THE DRAWINGS

FIG. 1 is a side view of a piece of tubing or pipe in which a coped end condition of the jointing system has been formed in one end of the tubing, according to one implementation.

FIG. 2 is a perspective view of the embodiment of FIG. 1.

FIG. 3 is an end view of the coped end condition of the embodiment of FIG. 1.

FIG. 7 is a side view of a piece of tubing or pipe of an alternative embodiment of the jointing system wherein a straight end condition has been formed in the end of the tubing or pipe, according to one implementation.

FIG. 8 is a perspective view of the tubing or pipe of FIG. 7.

FIG. 9 is an end view of the tubing or pipe of FIG. 7.

DETAILED DESCRIPTION

The various embodiments disclosed or contemplated herein relate to devices, systems and methods for forming a joint, which are collectively referred to herein as the "joint system.". In various implementations of the joint system, a state, opening or "condition" is formed in a piece of tubing or pipe that greatly increases the surface area to be joined to a second section of tubing or pipe. The increased surface area of the condition simplifies the welding process and creates a much stronger joint.

Turning to the drawings in greater detail, FIGS. 1-3 depict implementations of the system 1 having a pipe 10, such as a tube or other known elongate metal portion known in the welding arts. In these implementations, the pipe 10 has a round cross section and first 10A and second 10B ends. As discussed below, many alternate implementations are possible. It will be appreciated that the disclosed implementations of the jointing system are particularly suited for joining light gage tubing or pipe 10, and these implementations enable even a relatively unskilled welder to quickly create strong, reliable joints without error.

Figure 4:
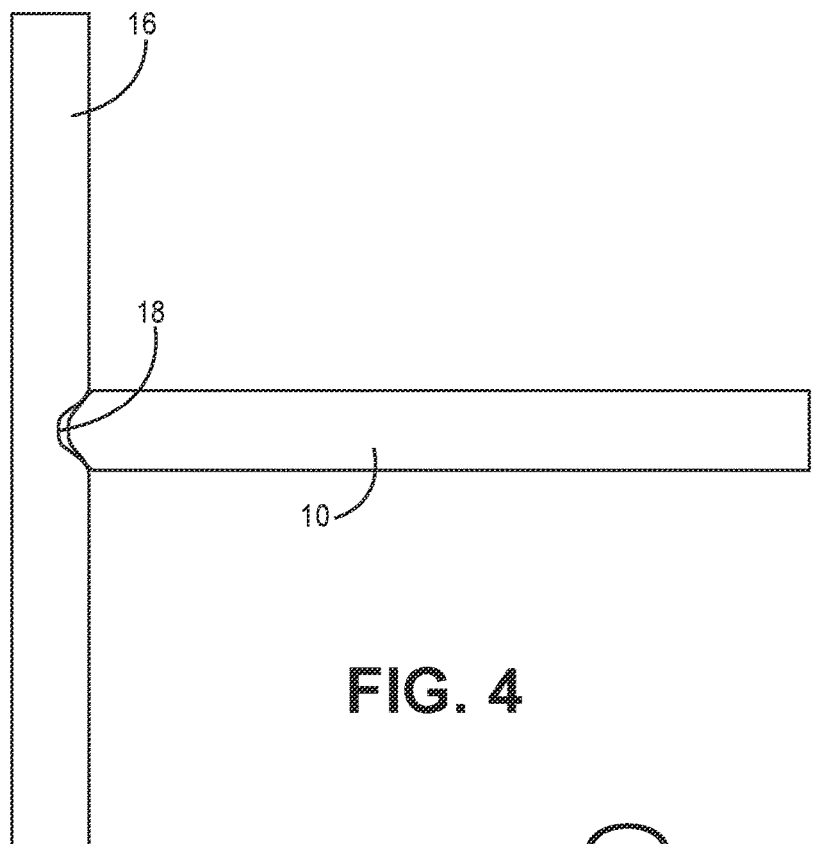
FIG. 4 is a side view of the piece of tubing of FIG. 1 welded to a perpendicular piece of tubing or pipe material.
Figure 5:
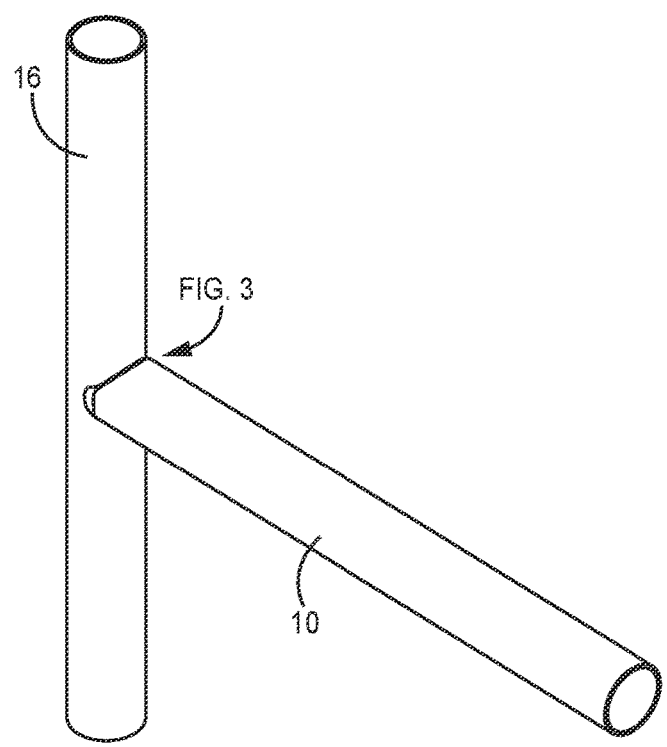
FIG. 5 is a perspective view corresponding to FIG. 4.

In the implementations of FIGS. 1-3, a saddle or coped end condition 12 has been formed in one end 10A section of the tubing 10. It is understood that in various implementations, this condition 12 can be formed at either, or both 10A, 10B ends. In various implementations, the condition 12 can be formed by the skilled artisan by "folding" portions of the tube (shown generally at 14) inward to form a flange or support section 14. It is understood that this support section 14 provides greater surface area for coupling the tube 10 to another metal portion, such as a rounded tube, to form a joint, as is shown in FIGS. 4-5. In one non-limiting example, if the tubing 10 is 18 gage, 1.66 inch OD tubing, the surface area at the union is increased by five times, from 0.228 sq. in. to 1.156 sq. in. It is understood that myriad additional sizing options and implementations are possible.

Accordingly, it is understood that in these implementations, the support section 14 material (such as at end 10A of the tubing 10 or pipe, or within the length of the tube, as described below) is folded inward, creating a flange section 14 having a large surface area. Folding in of the material of the support section 14 rather than removing it also eliminates the sharp edge which reduces the risk of blowing a hole during the welding process. Instead, in these implementations, a rounded surface is created at the location of the fold. Further, the in-folded material of the support section 14 creates a support for the joining process, according to these implementations.

In addition, the folded material of the support section 14, according to the implementations of FIGS. 1-3 and below presents additional mass at the site of the joint (shown, for example in FIG. 4 at 20) that provides support for the weld puddle being created at the weld seam, as would be appreciated by one of skill in the art.

Figure 6:
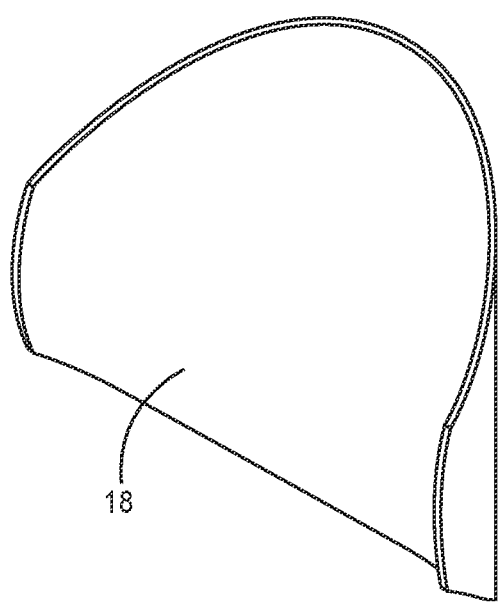
FIG. 6 is a perspective view of a piece of filler material used in forming the welded coped joint of the jointing system as shown in FIGS. 4 and 5.

Accordingly, as shown in the implementations of FIGS. 4-5, in use it is possible to form a perpendicular joint with a second section of tubing or pipe 16 (FIGS. 4 and 5). In these implementations, as best shown in FIG. 6, a substantially planar filler material 18 is cut and shaped into a disc- or other shaped "sheet" 18 to correspond generally to the coped end condition 12.

In use, heat is then applied at the joint at a temperature and duration sufficient to melt the filler material 18 which is used for brazing to form the brazed union 20. In one implementation, filler material 18 is silicon bronze. It is understood that many other materials can be used for the filler material 18, some non-limiting examples including aluminum-silicon, copper, brass, bronze and the like. One of skill in the art would appreciate further examples.

Here, "brazing" is the process of joining two or more metals together with a compatible filler metal by melting and flowing the filler metal into the joint 20. In these applications, the filler material 18 has a lower melting point than the metals being joined, and therefore acts to bind to the joined pipes 10, 16. It is understood that this brazing method differs from traditional arc welding as it does not melt the work pieces to form the union 20. It is further understood that in these implementations, the end condition 12 and support section (shown, for example, in FIGS. 1-3 at 14) provide a heat sink during the welding process. The heat sink of these implementations "pulls," or otherwise conducts heat to the sharp edge of the material (shown in FIG. 3 at 14A) which is now out of the intended "weld zone," as would be appreciated.

Since the metal of the filler material 18 has a lower melting point than the base metals being fused (here, as would be shown by the first 10 and second 16 tubes), the filler material 18 typically has less strength than the base metals (of the tubes 10, 16) hence creating a weaker joint than traditional arc welding. It is understood that to overcome this weakness, the American Welding Society created a rule call the AWS 3T rule. The 3T rule holds that brazed weld joints must have at least three times the surface contact as the thinnest material being joined. In doing so, the strength of the filler metal 18 will likely exceed the strength of the thinnest base metal being joined and failure will happen in the base metal 10, 16. As a result of the 3T rule, many applications are not suitable to brazing due to the inability to have three times the surface contact.

However, as shown in the implementations of FIGS. 4-5, the filler material 18 of these implementations is interposed at the joint between the coped tubing 10 and the second piece of tubing 16.

In the implementations of FIGS. 7-9, the jointing system 1 tube 10 features a "straight" end 12. In these implementations, the end 12 of the tubing 10 has been flattened, for example by swaging. It will be appreciated that many other flattening or shaping methods are possible, such that the end 12 is arranged and/or constructed as "flat."

In the implementations of FIGS. 7-9, the end material (shown generally at 14) is folded inward to form an inwardly extended flange section 14. Rather than having the saddle or coped form of the tubing 10, this flange section 14 presents a planar edge suitable for joining with tubing or pipe having a flat side surface at the joint.

Figure 10:
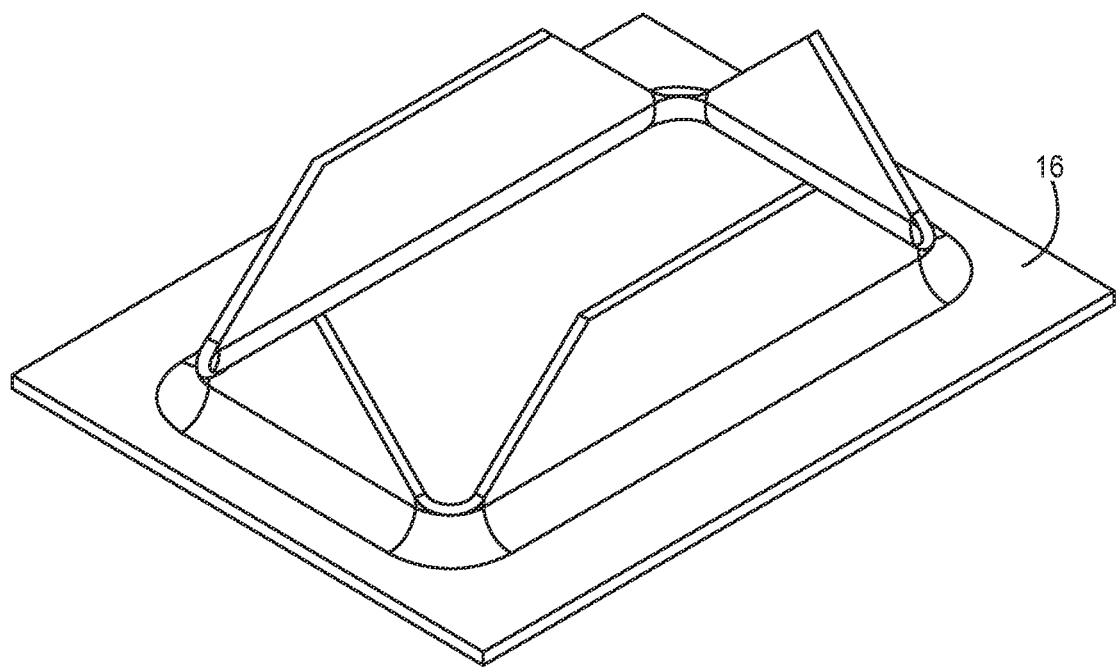
FIG. 10 is a perspective view of a piece of filler material used in forming a welded joint of the jointing system, according to one implementation.
Figure 13:
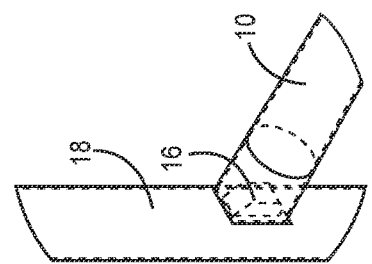
FIG. 13 is partially transparent detail view corresponding to FIG. 12 and showing the welded joint, according to one implementation.
Figure 12:
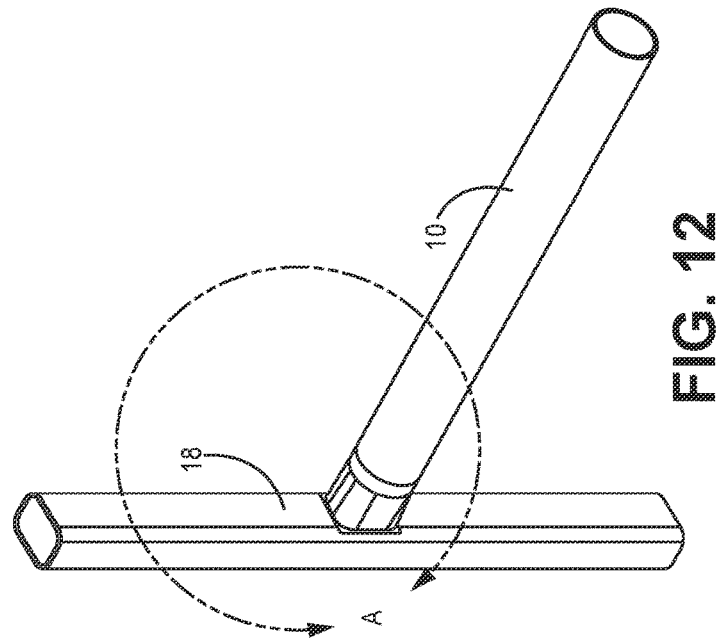
FIG. 12 is a perspective view corresponding to FIG. 11, according to one implementation.
Figure 11:
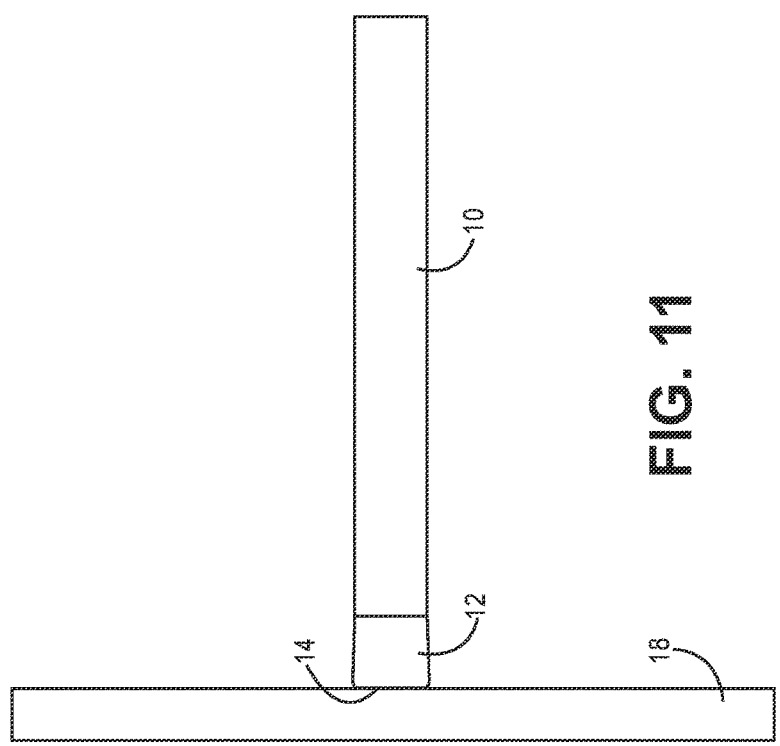
FIG. 11 is a side view of a T-joint formed between the piece of tubing or pipe of FIG. 7 and a perpendicular piece of flattened tubing or pipe material.
Figure 14:
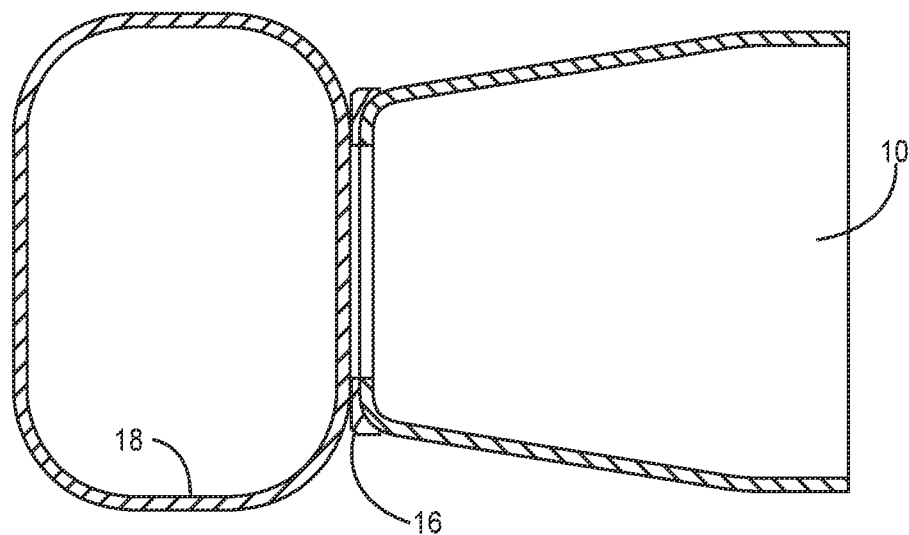
FIG. 14 is an enlarged cross-sectional view of welded joint formed between the straight end condition tubing or pipe of FIGS. 7-9 and a perpendicular piece of tubing or pipe, according to one implementation.

Again, a section of filler material 16 (FIG. 10) is used to form a perpendicular brazed union between the tubing 10 and a second piece of tubing 18 (FIGS. 11-14). The filler material 16 is positioned between the flange section 14 and the second tubing piece 18 at the site of the joint. While the tubing pieces 10 and 18 are held together, heat is applied at a temperature and for a duration sufficient to form the brazed union. The flange section 14 greatly increase the surface contact between the two tubing sections, thereby affording the benefits of the jointing system.

Figure 15:
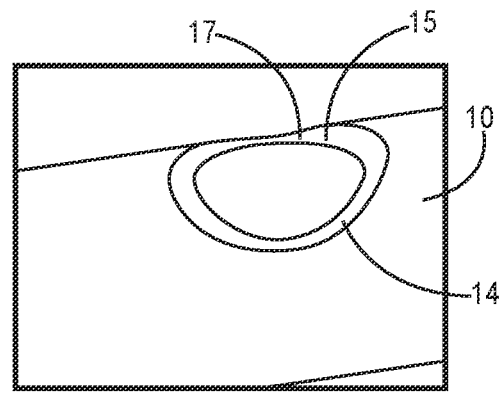
FIG. 15 is a perspective view of a tube or pipe having an opening set in the body, according to one implementation.
Figure 16:
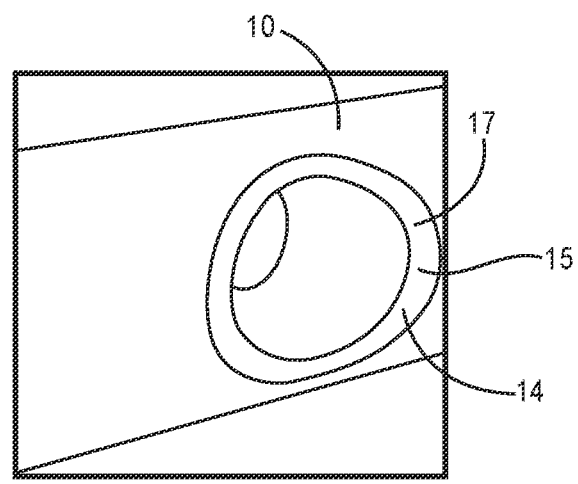
FIG. 16 is a further perspective view of a tube or pipe having an opening set in the body, according to one implementation.

In the system 1 implementations of FIGS. 15-16, an opening 15 can be made in the body of the tube 10, such that a lumen 17 is created therewith. In these implementations, the opening 15 can be constructed and arranged such that a support section 14 is formed around the lumen and at the outer perimeter of the opening 15, as would be understood by one of skill in the art. In these implementations, the tube 10 can be joined to a second tube (not shown) via filler material 18 using brazing techniques, so as to satisfy the 3T rule, as described above.

Another advantage of the jointing system is that it is particularly suited for robotic welding. Robot welders lack the ability to recognize the overheating created in the traditional cope method, nor can it respond and reposition in the way a skilled human can. The folded cope of the jointing system greatly reduces the need to recognize and react to overheating, thereby raising the suitability and reliability of robot welding.

It is understood that the various implementations eliminate the challenge of nonconformance with the 3T rule by processing the tubing or pipe 10 in such a way as to allow for a surface at the support section 14 that can more than accommodate the parameters of the 3T rule. Typical pipe saddles, copes or through holes provide a sharp edge or cross section of material at the point where the joining occurs, and will not allow conformance with the 3T rule since the edge or end of the material gives a cross section that is equal to the thickness of the material.

In the various implementations discussed herein, the material at the end of the tubing or pipe 10 is folded inward to create the support section 14, and therefore a surface greater than three times the thickness of the material 10. In addition, it will be appreciated that these embodiments create conditions for capillary action, which further draws the brazing material into the union or joint 20. To further enhance the weld joint 20, the folded edge of the support section 14 creates a heat sink which causes heat being applied in the brazing process to flow to the sharp inner edge of the material. This heat sink insure proper melting of the brazing material and enhances the capillary action by drawing the flowing material to the hottest point. This action creates a highly repeatable brazing process that meets and exceed the AWS 3T rule. It is also understood that the balance of heat between the two pieces being joined is better equalized and the risk of burning through is greatly reduced.

Among the advantages of the jointing system are that it reduces the cost of creating welded joints, it reduces the skill required to form the welded joints, it increases the strength of the welded joints, and it increases the reliability of forming the welded joints without errors.

Although the disclosure has been described with reference to preferred embodiments, persons skilled in the art will recognize that changes may be made in form and detail without departing from the spirit and scope of the disclosed apparatus, systems and methods.

What is claimed is:

1. A system for forming a structural joint comprising:
   (a) a first elongate tube comprising a lumen and an inwardly extending flange and
   (b) a second elongate tube,
   wherein the inwardly extending flange forms a surface area at least three times greater than a thickness of the first elongate tube.

2. The system of claim 1, wherein the structural joint is formed via arc welding.

3. The system of claim 1, further comprising a filler material, wherein the filler material is disposed between the inwardly extending flange and the second elongate tube, and wherein the structural joint is formed via brazing.

4. The system of claim 3, wherein the filler material is shaped to correspond to a shape of the inwardly extending flange.

5. The system of claim 3, wherein the filler material has a melting point lower than a melting point of the first elongate tube and the second elongate tube.

6. The system of claim 5, wherein the filler material is at least one of silicon bronze, aluminum-silicon, copper, brass, and bronze.

7. The system of claim 6, wherein the filler material is silicon bronze.

8. A joining system, comprising:
a) a first elongate tube comprising:
  i) a lumen; and
  ii) a support section flange extending into the lumen;
b) a filler material; and
c) a second elongate tube comprising a sidewall section, wherein the first elongate tube and the second elongate tube form a joint by joining the support section flange to the second elongate tube by disposing the filler material adjacent to the support section flange and second elongate tube and wherein the joint satisfies a 3T rule.

9. The joining system of claim 8, wherein the joint is formed by brazing.

10. The joining system of claim 9, wherein the joint is configured so as to have at least three times a surface contract as a thinnest portion of the first elongate tube or the second elongate tube.

11. The joining system of claim 8, wherein the filler material is selected from the group consisting of silicon-bronze, aluminum-silicon, copper, brass and bronze.

12. The joining system of claim 8, wherein the joint is formed by arc welding.

13. The joining system of claim 12, wherein the support section flange acts as a heat sink during arc welding.

* * * * *